(12) United States Patent
Tebbit

(10) Patent No.: US 8,665,388 B2
(45) Date of Patent: Mar. 4, 2014

(54) DISPLAY ASSEMBLY AND METHOD

(75) Inventor: Nigel John Tebbit, Newmarket (GB)

(73) Assignee: GE Aviation UK, Manchester (GB)

( * ) Notice: Subject to any disclaimer, the term of this patent is extended or adjusted under 35 U.S.C. 154(b) by 1281 days.

(21) Appl. No.: 11/857,606

(22) Filed: Sep. 19, 2007

(65) Prior Publication Data

US 2008/0068529 A1 Mar. 20, 2008

(30) Foreign Application Priority Data

Sep. 19, 2006 (GB) .................................. 0618371.9

(51) Int. Cl.
*G02F 1/1333* (2006.01)
*G02F 1/1339* (2006.01)

(52) U.S. Cl.
USPC ............................................ 349/58; 349/153

(58) Field of Classification Search
USPC .................................................. 349/58, 153
See application file for complete search history.

(56) References Cited

U.S. PATENT DOCUMENTS

| | | | |
|---|---|---|---|
| 5,179,459 A | | 1/1993 | Plesinger |
| 5,412,492 A | * | 5/1995 | Zammit et al. ................ 349/1 |
| 5,606,438 A | * | 2/1997 | Margalit et al. .............. 349/60 |
| 5,835,179 A | * | 11/1998 | Yamanaka ................... 349/161 |
| 6,204,906 B1 | | 3/2001 | Tannas, Jr. |
| 6,380,999 B1 | | 4/2002 | Tannas, Jr. |
| 6,573,956 B1 | | 6/2003 | Shibata |
| 7,002,660 B2 | | 2/2006 | Watson |
| 2003/0123019 A1 | | 7/2003 | Kim et al. |
| 2004/0095631 A1 | | 5/2004 | Poll et al. |
| 2005/0073642 A1 | | 4/2005 | Dunn et al. |

FOREIGN PATENT DOCUMENTS

| | | |
|---|---|---|
| EP | 1443386 A1 | 8/2004 |
| GB | 2442056 B | 4/2011 |
| JP | 2005099221 | 4/2005 |
| JP | 2006053169 | 2/2006 |
| WO | WO 2005/092057 | 10/2005 |

OTHER PUBLICATIONS

Search Report in foreign counterpart application GB0618371.9 dated Dec. 20, 2007.
Examination Report in foreign counterpart application GB0618371.9 dated Jan. 10, 2011.
Notice of Grant in foreign counterpart application GB0618371.9 dated Mar. 29, 2011 as Patent No. GB2442056.

* cited by examiner

*Primary Examiner* — Jessica M Merlin
(74) *Attorney, Agent, or Firm* — Global Patent Operation; Vivek P. Shankam

(57) ABSTRACT

A display assembly and a method of making a display assembly are disclosed. A display assembly is disclosed including a display unit 1 and two transparent plates 2, 3 bonded respectively to the front and rear surfaces of the display unit 1 by an adhesive. A tape is secured along at least one side of at least one of the plates 2, 3 on its inner surface such that the adhesive inner region of the tape bonds with the tape and not directly with the surface of the plates 2, 3.

7 Claims, 1 Drawing Sheet

DISPLAY ASSEMBLY AND METHOD

BACKGROUND

The field of the invention relates to displays and to methods of manufacture of displays.

Embodiments of the invention are more particularly concerned with arrangements by which non-uniformity in the display output as a result of display ruggedisation can be reduced.

SUMMARY OF THE INVENTION

Liquid crystal displays (LCDs) are widely used in a variety of applications and are available commercially at relatively low cost. Standard, commercial LCDs are not usually suitable for aircraft, military or other use where the display must be capable of withstanding vibration, shock and the like. Also, aircraft displays usually require various filters, anti-reflection coatings, high-intensity backlights and the like in order to be suitable for use in an aircraft. It is common practice to modify standard commercial LCD displays, to make them suitable for aircraft or similar use, by attaching plates to the front and rear surface of the LCD display. U.S. Pat. No. 5,606,438, for example, describes an LCD display sandwiched between two transparent plates by means of layers of a transparent adhesive. WO2005/092057 describes an arrangement where an LCD display is supported around its edge on the rear surface of a frame and is bonded to a glass plate attached to the front of the frame by an adhesive filling the gap between the rear of the glass plate and the front of the LCD. One problem with such arrangements is that the adhesive bond can cause stresses in the LCD display leading to optical distortion, typically pale areas or bands on the display that can be particularly conspicuous when the display is driven to a dark field. This effect occurs mainly along the edges and or alternatively at the corners and is commonly known as window-framing. This problem can be particularly severe where the glass plates and the adhesive bond overlaps the edge of the LCD causing a direct adhesive bond between the rear surface of the front plate and the forward surface of the rear plate. Other documents describing LCD displays include US20050073642, U.S. Pat. No. 7,002,660, U.S. Pat. No. 6,380,999, U.S. Pat. No. 6,204,906, U.S. Pat. No. 6,573,956, JP2006053169, JP2005099221 and U.S. Pat. No. 5,179,459.

Another problem where LCDs are used with high intensity backlights, such as cold cathode discharge lamps, is that light can seep around the edge of the display through the ruggedisation plates and be scattered by refraction and reflection.

It is an object of the present invention to provide alternative displays and methods of manufacture of displays.

According to one aspect of the present invention there is provided a display assembly including a display unit and two transparent plates bonded respectively to the front and rear surfaces of the display unit by an adhesive, a tape secured along at least one side of at least one of the plates on its inner surface such that the adhesive in the region of the tape bonds with the tape and not directly with the surface of the plates.

The transparent plates preferably overlap the display unit around its edge and the adhesive extends between the plates in the overlapping region. Preferably, both plates have tape secured to their inner surfaces. Preferably, the plates have tape extending along all four sides. The display unit may include an LCD. The tape is preferably opaque and is preferably black. The tape preferably extends along an edge surface of the plates as well as the facing surfaces. One of the plates may include a transparent heater element. The plate on the front of the display assembly preferably has an anti-reflection outer surface.

According to another aspect of the present invention there is provided a method of making a display assembly including the steps of providing a display unit and first and second transparent support plates, adhering a tape around the periphery of at least one of the transparent plates, applying an adhesive between one face of the display unit and the first plate, applying an adhesive between the other face of display unit and the second plate, so that adhesive extends over the tape on both plates.

Preferably the plates overlap the display unit around its edge and the adhesive between the display unit and the first plate combines with the adhesive between the display unit and the second plate around the edge of the display unit.

DESCRIPTION OF THE DRAWINGS

An LCD display assembly according to the present invention will now be described, by way of example, with reference to the accompanying drawing, in which.

DETAILED DESCRIPTION

The assembly comprises an AMLCD display unit 1 supported in a sandwich construction between two glass support plates 2 and 3 by respective layers 21 and 31 of a lamination adhesive so as to make the display unit more rugged and resistant to vibration and shock. A conventional cold cathode backlight 4 is located below or behind the display unit 1. Alternative backlights could be used, such as including an LED array. The assembly is contained in an outer housing, which has not been shown, for clarity.

Figure 1:
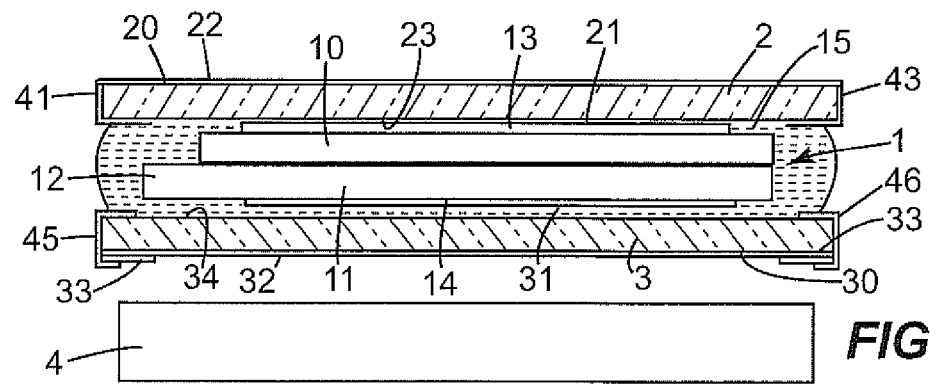
FIG. 1 is a cross-sectional, schematic side elevation through the assembly.

The display unit 1 is of a conventional construction having a square shape with sides each about 135 mm long. The unit 1 has an upper, front glass plate 10 and a lower, rear glass plate 11 bonded together around their edges and containing a liquid crystal material between the plates (not shown) in the usual way. The rear plate 11 projects outwardly beyond the front plate 10 along adjacent sides (only one side 12 being visible in FIG. 1) and supports connector tabs connected with driver interface boards (not shown) by which the matrix elements within the display 1 can be energised. The front plate 10 and the rear plate 11 have respective polarising layers 13 and 14 on their external surfaces. The polarising layers 13 and 14 are slightly smaller than the front and rear plates 10 and 11 leaving a gap 15 around their edges of about 0.3 mm. The planes of polarisation of the two layers 13 and 14 are crossed, that is, they are oriented at right angles to one another, in the usual way, so as to block passage of light from the backlight 4 through the display unit 1 except in regions where the liquid crystal material is energised to rotate the plane of polarisation of the light passing through the rear polariser 14.

Figure 2:
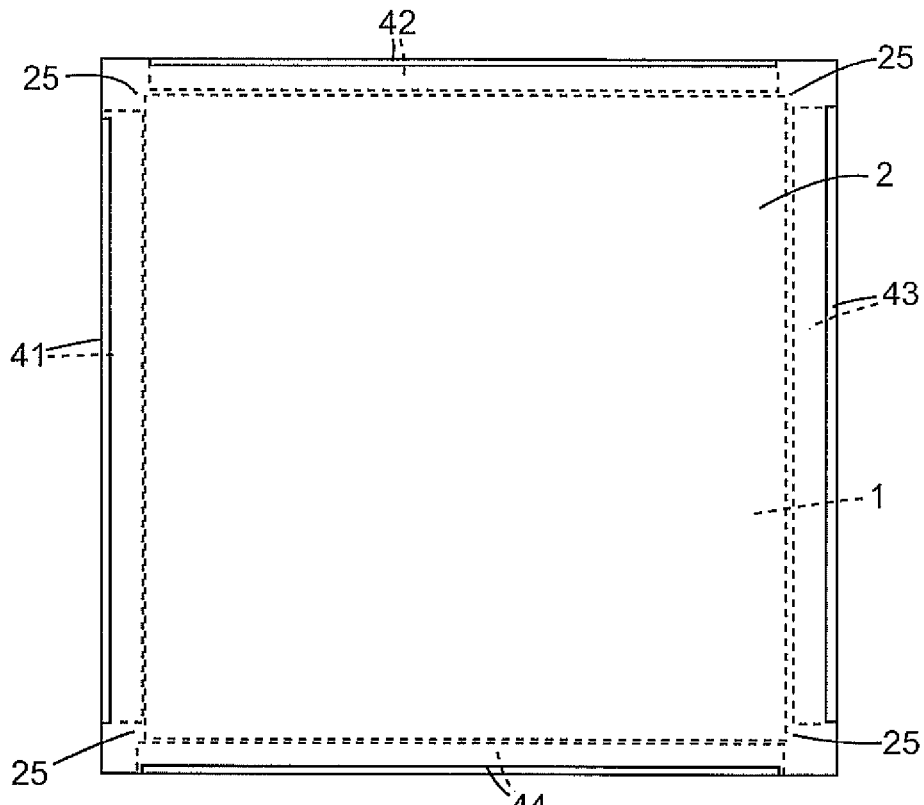
FIG. 2 is a plan view of the assembly.
Figure 3:
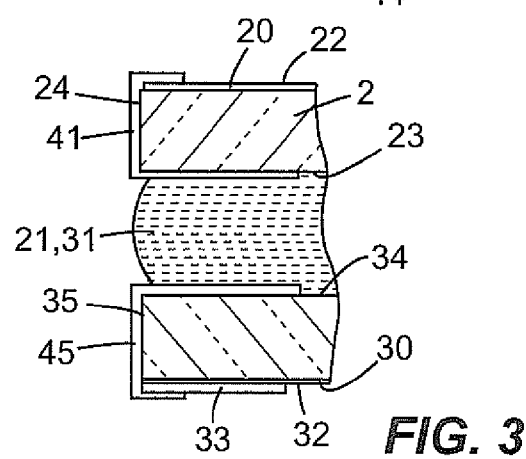
FIG. 3 is an enlarged cross-sectional view of one edge of the assembly.

The front or upper support plate 2 is made of glass, is square in shape and slightly larger than the display unit 1, being 136 mm square so that it overlaps around the edge of the display unit 1 by about 0.5 mm on each side. The plate 2 is typically about 2 mm thick. The front surface 20 of the front plate 2 has an anti-reflection coating 22 to reduce the amount of light reflected to the viewer by this surface. The front support plate 2 is modified by applying four strips 41 to 44 of opaque black tape to the lower, inner surface 23 of the plate. The tape strips 41 to 44 are of polyamide such as sold by DuPont under the name Kapton CB100 and have a silicone adhesive (such as KatCo 2277 adhesive) on one surface. The tape is about 3 mm wide and about 75 micron thick. Each strip of tape 41 to 44 is applied parallel to an edge at the side of the plate 2 so that the major part of its width is adhered to the lower, inner surface 23 of the plate. The remainder of the width of the tape 41 to 44 is folded up the edge 24 of the plate 2 with a small part being folded over the front surface 20, as seen most clearly in FIG. 3. The strips 41 to 44 do not extend right to the end of the plate 2 but leave small gaps 25 (FIG. 2) in each corner to facilitate escape of air bubbles during assembly. In some applications it might be possible to apply the tape in one continuous strip round all four sides of the plate.

The rear or lower support plate 3 is also of glass and is of the same shape and size as the front plate 2. The rear plate 3 is arranged so that its edges align with the edges of the front plate 2. The rear, external or lower face 30 of the lower plate 3 is coated with an electrically-conductive heater layer 32 of indium tin oxide (ITO) the thickness of which is such that the layer is transparent to light from the backlight 4. Two thicker metal stripes 33 along opposite sides of the lower face 30 overlie and make electrical contact with opposite ends of the layer 32. When the stripes 33 are connected to a power source, the current flowing through the layer 32 produces resistive heating and warms the display assembly. The rear plate 3 also has four strips of tape (only two of which 45 and 46 are visible) applied to the upper, front face 34 of the plate and folded down to overlap the edge 35 and a small region of the lower face 30. The tape 45 and 46 is identical with the tape 41 to 44 used on the front plate 2 and is similarly applied to leave small gaps in the corners.

The front plate 2 is bonded to the front surface of the display unit 1 by the layer 21 of adhesive. The adhesive 21 extends in a thin film between the polarisation layer 13 and the rear surface 23 of the front support plate 2 and overlaps the edges of the polarisation layer to bond directly with the front plate 10 of the display unit 1 and with the display's rear plate 11 where this is exposed (at 12) beyond the edge of the front plate. In particular, the adhesive layer 21 bonds with that part of the strips of tape 41 to 44 applied to the rear surface 23 of the front support plate 2. The layer 21 of adhesive also overlaps the display unit 1 around its edges.

The rear support plate 3 is similarly bonded to the rear plate 11 of the display unit 1 by the layer 31 of adhesive. The adhesive 31 extends in a thin film between the polarisation layer 14 and the front face 34 of the rear support plate 3 and overlaps the edges of the polarisation layer to bond directly with the underlying display rear plate 11. The adhesive layer 31 bonds with that part of the strips of tape 45 and 46 applied to the front face 34 of the rear support plate 3. The rear adhesive layer 31 also overlaps the display unit 1 around its edge to combine with the overlapping part of the front adhesive layer 21 so that they merge together.

The display is assembled by applying a measured quantity of the adhesive 21 to the rear surface 23 of the front support plate 2 after it has been inverted in a suitable jig (not shown). One side edge of the display unit 1 is placed in contact with the edge of the jig, with the opposite edge of the unit being raised so that the unit is at an angle to the front plate. The display unit 1 is then hinged slowly down onto the front support plate 2 to avoid trapping air bubbles. The display unit 1 and front support plate 2 is left in this position for a few minutes to allow the adhesive to flow and fill all the gaps between the display unit and plate but to allow insufficient time for curing. This sub-assembly is then inverted and placed in a jig so that the rear surface of the display unit 1 is uppermost. A measured quantity of adhesive 31 is applied to the rear surface of the display unit 1 and the rear support plate 3 is placed with one edge in contact with the edge of the jig and the opposite edge raised at an angle. The rear support plate 3 is then lowered slowly into contact with the adhesive 31 to a flat position. Because the rear layer 31 of adhesive is applied before the front layer of adhesive has cured, the two layers of adhesive can flow into one another and merge into a single layer around the edge of the display unit 1. The assembly is left in this position for about 12 hours before being cured at an elevated temperature of about 50° C. for about 20 hours.

It has been found that the tape applied to the front and rear support plates helps to reduce the windowframe effect, which can otherwise occur. That is, a whitening effect in corner and edge regions of the display, which is especially visible when the display is driven to a flat field black. This distortion is thought to be caused by compressive stresses on the AMLCD display unit causing a localised reduction in the cell gap of the display, which prevents correct polarisation. These compressive stresses are thought to be caused by the lamination adhesive bonding directly between the front support plate 2 and the rear support plate 3 around the edge of the display unit 1 and contracting slightly in this gap. The tape prevents the adhesive bonding directly to the support plates in the regions covered by the tape. Instead, the adhesive bonds with the tape and any contraction in the adhesive can be accommodated by small movement of the tape relative to the support plates.

In addition to reducing the stress effects mentioned above it has been found that the tape also reduces the amount of stray light from the backlight 4 that escapes around the side of the display assembly between the assembly and its outer housing. In order to benefit from the stray light reducing effect the tape needs to be opaque but it could be of other colours than black. Where stray light is not a problem, the tape could be clear or translucent. Also, where there is no need to block stray light, the strips of tape need not be folded around the edge of the support plates.

The invention is not limited to LCD displays but could be used in other displays having similar problems. It is not essential that the front and rear support plates overlap the edge of the display unit since the tape could be used to relieve stress in bonds directly between the plates and surfaces of the display unit. Whilst it is preferable to apply tape to both support plates, some quality improvement may be achieved by applying the tape to only one support plate.

What is claimed is:
1. A display assembly comprising:
 a display unit;
 a pair of transparent plates larger than the display unit and comprising a front plate and a rear plate bonded respectively to a front surface and a rear surface of the display unit; and
 an adhesive disposed between an inner surface of the front plate and the front surface of the display unit and between an inner surface of the rear plate and the rear surface of the display unit,
 wherein each of the front plate and the rear plate overlap beyond an edge of the display unit to form an overlapping region,
 wherein the adhesive fills the overlapping region about the periphery of the display unit,
 wherein tape comprising opaque material is secured in the overlapping region to the inner surface at an edge of the front plate and the inner surface at an edge of the rear plate such that the adhesive in the region of the tape bonds with the tape and not directly with the inner surface of the front plate and the inner surface of the rear plate, wherein the tape folds over the edge of the front plate and the rear plate to form a first part and a second part that is smaller than the first part, and wherein the fold positions the first part of the tape on the inner surface of the front plate and the rear plate and the second part of the tape on the side surface.

2. The display assembly of claim 1, wherein the transparent plates have tape extending along a plurality of sides.

3. The display assembly of claim 1, wherein the display unit includes an LCD.

4. The display assembly of claim 1, wherein the tape is opaque.

5. The display assembly of claim 1, wherein one of the transparent plates includes a transparent heater element.

6. The display assembly claim 1, wherein the transparent plate on the front of the display assembly has an anti-reflection outer surface.

7. A method of making a display assembly, the method comprising:

arranging a display unit, a first support plate and a second support plate that are larger than the display unit such that the first support plate and the second support plate overlap beyond an edge of the display unit to form an overlapping region;

adhering a tape on an inner surface within the overlapping region of the first support plate and the second support plate;

applying an adhesive between a front surface of the display unit and the inner surface of the first transparent plate, and applying an adhesive between a rear surface of the display unit and the inner surface of the second support plate, wherein the adhesive fills the overlapping region about the periphery of the display unit, wherein tape comprising opaque material is secured in the overlapping region to the inner surface at an edge of the front plate and the inner surface at an edge of the rear plate such that the adhesive in the region of the tape bonds with the tape and not directly with the inner surface of the front plate and the inner surface of the rear plate, wherein the tape folds over the edge of the front plate and the rear plate to form a first part and a second part that is smaller than the first part, and wherein the fold positions the first part of the tape on the inner surface of the front plate and the rear plate and the second part of the tape on the side surface.

* * * * *